United States Patent

Schroff et al.

[11] Patent Number: 5,917,193
[45] Date of Patent: Jun. 29, 1999

[54] METHOD AND APPARATUS FOR DETECTING LEAKS IN A CONTAINER

[76] Inventors: Gerhart Schroff, Reinhardstrasse 18, D-71116 Gaertringen; Michael Stetter, Am Hohenstein 4, D-73630 Ramshalden, both of Germany

[21] Appl. No.: 08/875,552
[22] PCT Filed: Jan. 9, 1996
[86] PCT No.: PCT/EP96/00065
  § 371 Date: Jul. 11, 1997
  § 102(e) Date: Jul. 11, 1997
[87] PCT Pub. No.: WO96/21850
  PCT Pub. Date: Jul. 18, 1996

[30] Foreign Application Priority Data

Jan. 14, 1995 [DE] Germany .................. 195 00 947

[51] Int. Cl.[6] .................................................. G01N 15/06
[52] U.S. Cl. .................... 250/573; 250/205; 73/40.5 A
[58] Field of Search ..................... 250/573, 576, 250/205; 73/40, 40.7, 40.5 A

[56] References Cited

U.S. PATENT DOCUMENTS 4,457,162  7/1984  Rush et al. .................................. 73/24
4,979,820  12/1990  Shakkottai et al. ..................... 356/129

FOREIGN PATENT DOCUMENTS 86-04746  8/1986  WIPO.

Primary Examiner—Que T. Le
Attorney, Agent, or Firm—Flynn, Thiel, Boutell & Tanis, P.C.

[57] ABSTRACT

The invention concerns a method and device for checking tightness of containers, housings and similar test objects (15). The test object (15) is subjected to a pressurized test gas. If a leak (28) is present, test gas escapes from the text object (15) and is exposed in a test chamber (18) to an intensity-modulated electromagnetic wave field emitted by a laser (1). The wave field contains frequency components which are absorbed by the test gas to produce a photo-acoustic signal indicative of the presence of a leak. To facilitate a quantitative tightness examination even using a longitudinal multimode laser with several laser modes which can be absorbed by the test gas, it is proposed according to the present invention that the temperature of the laser (1) should be set to a reference value and the excitation power of the laser should be kept at a constant mean level, so that the photo-acoustic signal can be measured and evaluated as a measure of the test gas concentration in the test chamber and/or of the size of the leak from the test object. To improve measuring accuracy, a reference chamber (5) with a predetermined test gas concentration is in addition exposed to the intensity-modulated wave field emitted by the laser (1); the photo-acoustic signal (6) produced in the reference chamber (5) is then used either for standardization purposes for when the test gas concentration in the test chamber (18) is determined, or for adjusting the reference temperature value ($T_{ref}$) of the laser (1) to a predetermined working point.

25 Claims, 3 Drawing Sheets

METHOD AND APPARATUS FOR DETECTING LEAKS IN A CONTAINER

FIELD OF THE INVENTION

The invention relates to a method and a device for checking the leak tightness of containers, housings, and similar test objects, of the type described in the preamble of patent claims 1 and 13.

BACKGROUND OF THE INVENTION

In a known method for checking the. leak tightness of containers (U.S. Pat. No. 5,161,408), the test object is subjected to a pressurized test gas, and the test gas escaping from test test object in the instance of a leak is subjected in an analyzing volume to an intensity-modulated electromagnetic wave field which is emitted by a laser, the wave field containing frequency components which are absorbed by the test gas, producing a photo-acoustic signal which is indicative of a leak. When the laser light is radiated into the analyzing volume with a frequency which is tuned to the absorption frequency of the test gas, a portion of the molecules of the test gas are excited to a higher state of energy by the absorption of the electromagnetic waves. Through collisions with other molecules in the analyzing volume the excited molecules may impart some or all of their excitation energy and transform the energy into translational, rotational or vibrational energy of the collision partners. The rise in translational energy of the molecules in the analyzing volume corresponds to a temperature rise and therefore a rise in pressure. When the intensity of the irradiation wave field is periodically varied, periodic pressure changes result, which can be detected by means of a pressure or acoustic sensor. As a test gas sulfur hexafluoride ($SF_6$) can for instance be used, and the laser can be a $CO_2$-laser. In the known method the photoacoustic effect is used to localize a leak at the surface of the test object. It is not possible, though, to quantatively determine the size of the leak.

Based on this, it is the object of the invention to develop a method and a device for cheking the leak tightness of the type described above, with which a quantitative leak check may be performed with little expenditure.

For the solution of this object the combinations of features stated in patent claims 1 and 13 are proposed. Further developments and embodiments of the invention result from the dependent claims.

SUMMARY OF THE INVENTION

The solution according to the invention is based on the idea that even small changes of the laser temperature may lead to a sudden change of the mode structure, which make a quantitative analysis of photo-acoustic signals with respect to the present test gas concentration difficult or impossible. In order to avoid this disadvantage it is proposed according to the invention that the temperature of the laser is governed to a temperature set value and that the excitation power of the laser is held constant over a time average, if needed, so that the photo-acoustic signal is a measure for the test gas concentration in the test volume and/or for the size of a leak. This makes it possible for the first time to quantitatively analyze the photo-acoustic signals even when using longitudinal multi-mode lasers having a number of frequencies which can be absorbed by the test gas. It is therefore not necessary to rely on the technically much more complex and larger frequency-stabilized mono-mode lasers.

The intensity of the radiation field may be modulated by chopping a laser beam emitted by the laser or by pulsing the excitation power.

With the method according to the invention it is also easily possible to vary the mode structure and therefore the emitted frequency band of the laser by adjusting the temperature set value. This makes it possible to eliminate the influence of other laser light-absorbing gases on the measurement of the test gas concentration.

According to a preferred embodiment of the invention it is provided that an additional reference volume having a given test gas concentration is subjected to the intensity-modulated radiation field emitted by the laser, and that the photo-acoustic signal generated in the reference volume is measured and analysed together with the photo-acoustically generated signal which is measured in the test volume in order to determine the test gas concentration in the test volume and/or the size of a leak. The photo-acoustic signal generated in the reference volume is an indirect measure of the actual operating state (emission frequencies) of the laser and may be used to determine a scale factor for the determination of the test gas concentration from the photo-acoustic signal of the analyzing volume.

According to a further preferred embodiment of the invention it is provided that an additional reference volume having a given test gas concentration is subjected to the intensity-modulated radiation field emitted by the laser, and that the intensity of the photo-acoustic signal generated in the reference volume is measured and goverened to a given set point by adjusting the temperature set value of the laser. In order to set the working point, the temperature set value of the laser can be varied before effecting the adjustment and determining during this the characteristic temperature dependency of the photo-acoustic signal generated in the reference volume, wherein a set point for the adjustment may be set on the temperature characteristic thus determined. The intensity maximum of the photo-acoustic signal generated in the reference volume can for instance be chosen as set point, wherein the temperature set value is advantageously chosen to be lower than the ambient temperature.

The photo-acoustically generated signals are advantageously transformed into electrical output signals by means of an acoustic sensor which is preferably designed to be a microphone, and analyzed to determine their intensity.

A test object of which the leak tightness is to be measured may be placed inside a sealed test chamber. When subjecting the inside of the test object to the test gas, a leak flow occurs in the instance of a leak, by which traces of the test gas reach the test chamber. For the detection of the test gas the gas content of the test chamber is transferred into a detection chamber (integral test). The localization of the leak may be performed by suctioning off ambient gas from the surface of the test object using a capillary (test probe) and transferring this gas to a detection chamber.

The device for applying the method according to the invention therefore comprises a detection chamber for accepting ambient gases of the test object, which ambient gases contain test gas in the case of a leak, further comprises a laser for creating an intensity-modulated laser beam which passes through the detection chamber, further comprises an acoustic sensor which is disposed within the detection chamber for measuring photo-acoustic signals which are generated in the detection chamber, and comprises a control circuit for controlling the temperature of the laser according to a given set temperature value.

The temperature control circuit advantageously has as a control element at least one thermoelectric element which is disposed on the surface of the laser and is preferably designed to be a Peltier element.

In order to improve the measuring accuracy there may be provided a reference chamber through which the intensity-modulated laser beam passes, which chamber is adapted to accept test gas in a defined concentration, a further acoustic sensor for measuring photo-acoustic signals being disposed within the chamber. The output signals of the acoustic sensors may be analyzed in a preferably computer controlled analyzing device for determining the test gas concentration in the detection chamber and/or the size of a leak in the test object.

In order to further improve the detection accuracy there is provided according to a preferred embodiment of the invention a control circuit for adjusting the temperature set value of the laser according to a deviation of the intensity of the output signal of the acoustic sensor of the reference chamber from the intensity value of a predetermined working point. In order to achieve a high detection sensitivity the working point may be chosen to correspond to the intensity maximum of the photo-acoustic signal generated in the reference chamber, which intensity maximum is obtainable as a function of the laser temperature.

The reference chamber and the detection chamber are advantageously constructed identically to each other and have the same volume. In order to achieve a constant illumination the detection chamber should be disposed in the beam axis of the laser beam following the reference chamber.

In order to optimize the control behaviour, the temperature control circuit and/or the temperature set value control circuit advantageously comprises a PID-controller.

For performing the integral test the following combination of features is preferred:

A test chamber for accepting the test object which is adapted to be subjected to the test gas, the test chamber having a gas inlet and a gas outlet, an inlet valve which is disposed at the inlet side of the test chamber and which is adapted to be subjected at its inlet side to ambient air or a scavaging gas, a vacuum pump which is disposed at the outlet side of the test chamber, two stop valves which are disposed one behind the other between the test chamber and the vacuum pump, and a bypass duct which is connected to the detection chamber and forms a bridge over the stop valve on the test chamber side.

BRIEF DESCRIPTION OF THE DRAWINGS

In the following the invention is further described with reference the accompanying drawing, in which.

DETAILED DESCRIPTION

Figure 1:
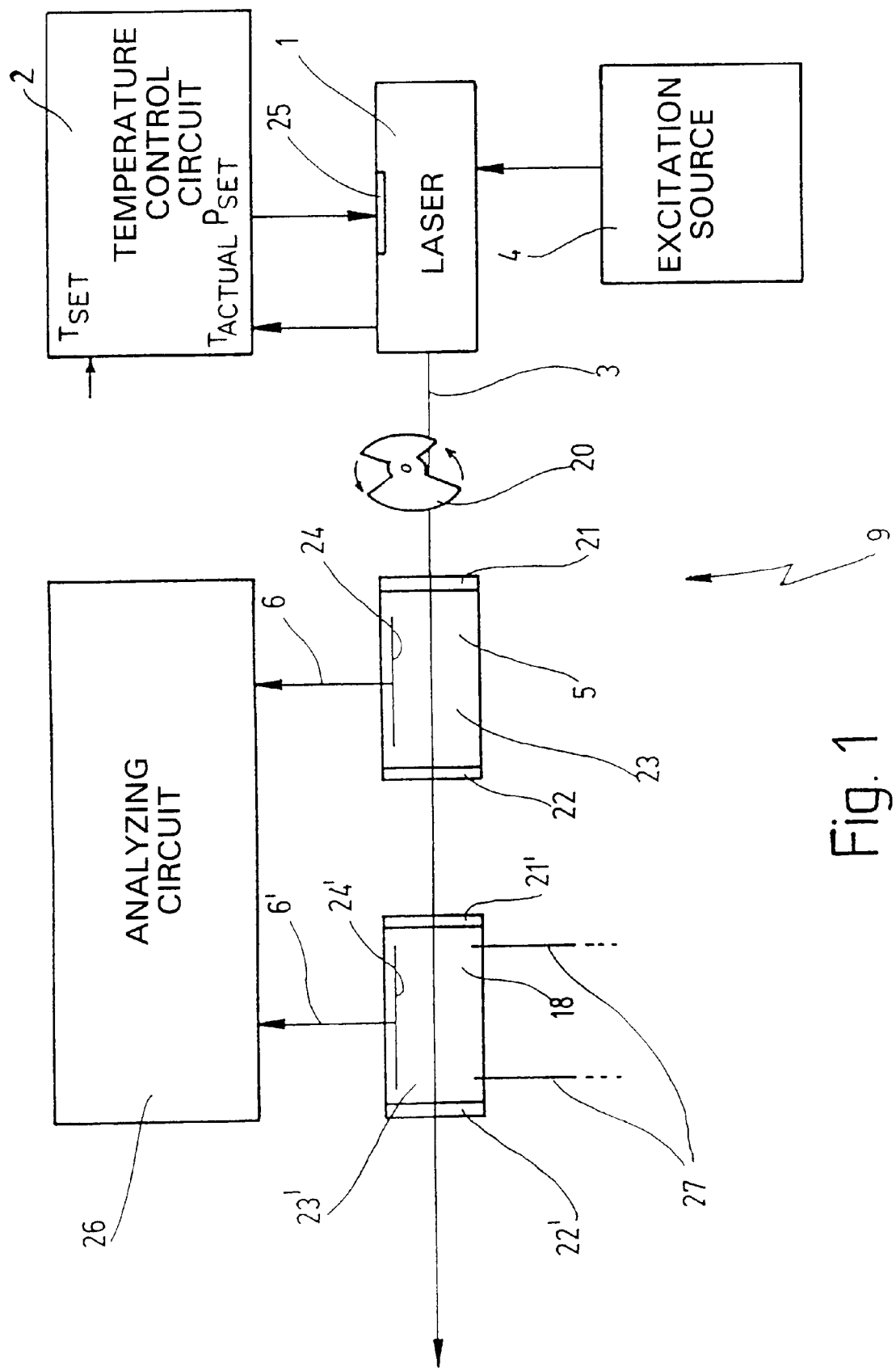
FIG. 1 shows a schematic diagram of the optical part of a leak detection system having a temperature controlled laser and an adjustable temperature set value.
Figure 2:
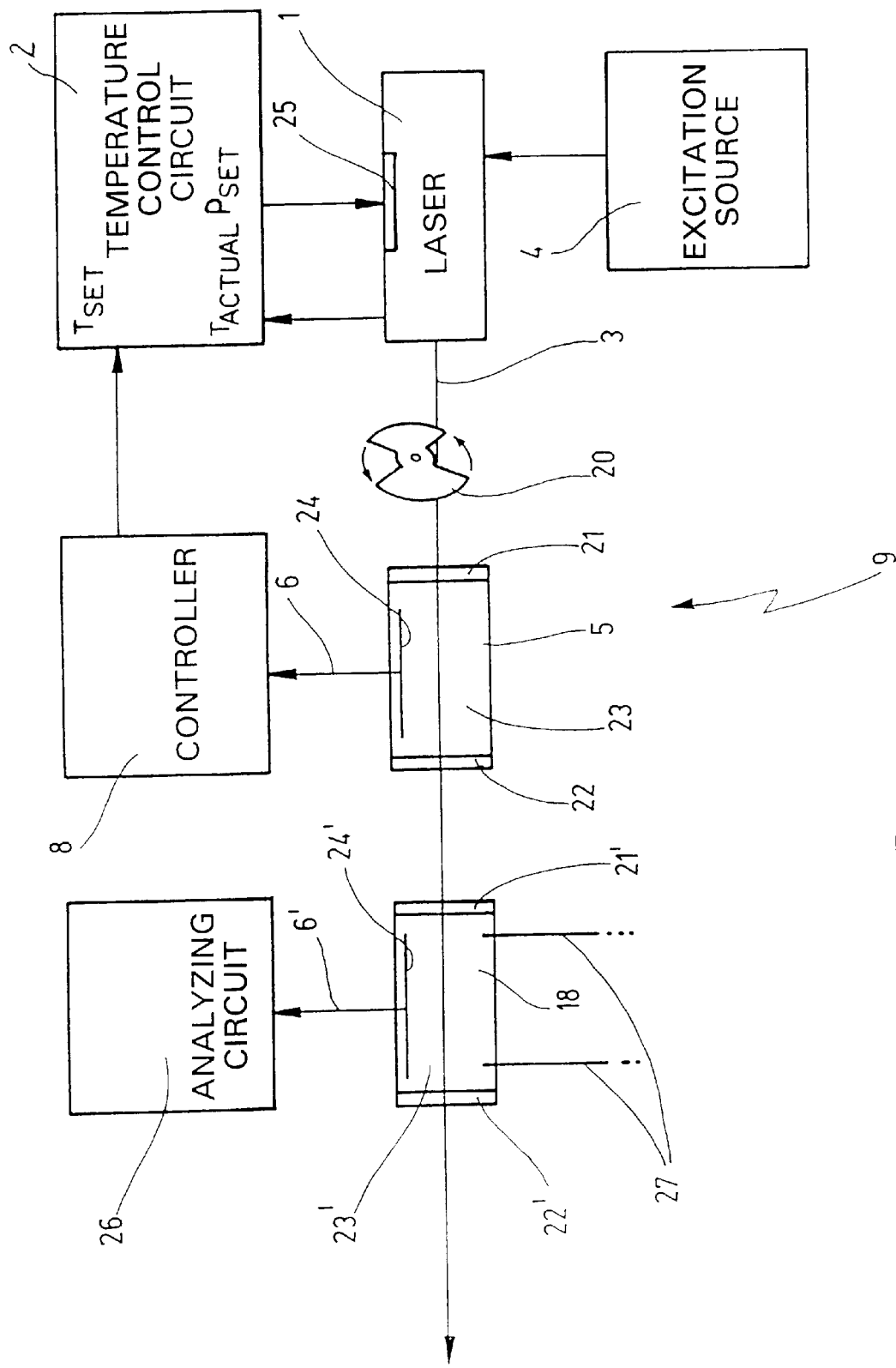
FIG. 2 shows an embodiment of a photo-acoustic leak detection system which is modified with respect to FIG. 1 and has a temperature controlled laser and an adjustable temperature set value.
Figure 3:
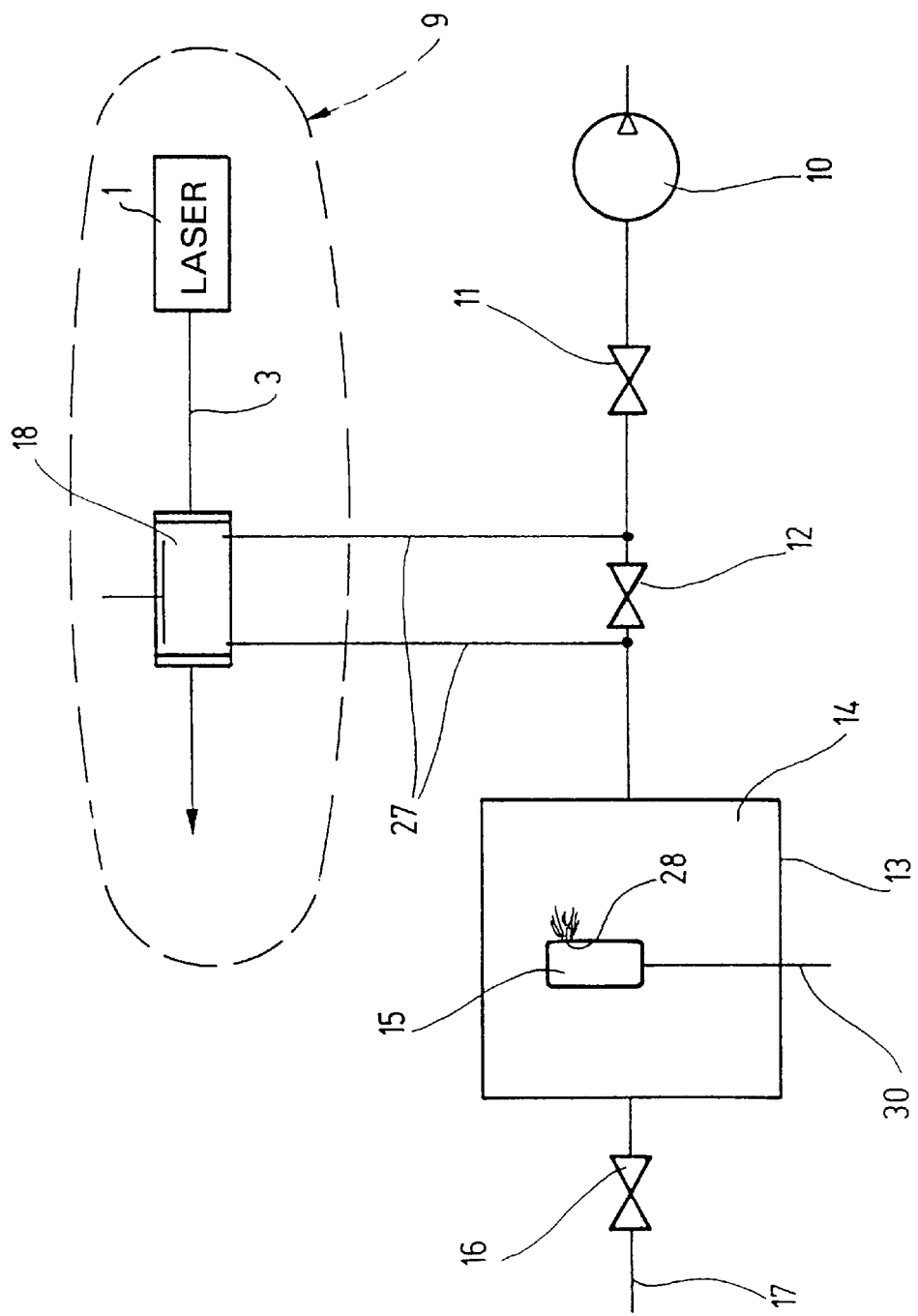
FIG. 3 shows a schematic representation of a complete leak detection system which operates according to the photo-acoustic method.

The devices 9 shown in FIG. 1 and 2 mainly serve to generate laser light having a defined emission spectrum by maintaining constant operating conditions of a laser in a photo-acoustic leak detection system as shown in FIG. 3. The laser 1 which is preferably designed to be a multi-mode $CO_2$-laser is supplied with power by means of the excitation source 4, preferably in the form of an electric direct current discharge or a high frequency discharge. In the optical axis of the laser light there are disposed one behind the other a mechanical chopper 20, a reference chamber 5, and a detection chamber 18. The reference chamber 5 and the detection chamber 18 are constructed identically with respect to each other. They each have an inlet window and an outlet window 21, 22, 21', 22', an interior space 23, 23' which may be filled with gas, and an acoustic sensor 24, 24' which is disposed in the interior space and which is designed to be a microphone. There is further provided a temperature control circuit 2 which constantly adjusts the laser temperature $T_{actual}$ to be equal to the value $T_{set}$ by varying the heat transfer $P_{set}$ to the laser 1. As control elements Peltier elements 25 disposed on the surface of the laser are preferably used. Furthermore, an analyzing circuit 26 is provided, which, in the embodiment of FIG. 1, is subjected to the output signals 6, 6' of the two acoustic sensors 24, 24' and, in the embodiment of FIG. 2, only to the output signal 6' of the acoustic sensor 24'. In the embodiment of FIG. 2, the output signal 6 of the acoustic sensor 24 which is disposed in the reference chamber 5 is analyzed in a controller 8 for adjusting the temperature set value $T_{set}$, as will be described in detail below.

Using the chopper 20, the laser beam 3 is. intensity-modulated with a predetermined frequency before it enters into the chambers 5 and 18. The excitation power of the laser is in this instance kept constant by means of the excitation source 4. In principle, it is also possible to modulate the intensity by means of the excitation source, wherein also in this instance the excitation power (averaged over a number of periods of the intensity modulation frequency) is to be kept constant.

The reference chamber 5 and the detection chamber 18 can be filled with a gas which may contain a fraction of a test gas. The test gas is chosen such that its absorption frequency spectrum corresponds at least partially to the emission frequencies of the laser 1. The radiation energy which is absorbed in the test gas while traversing the reference chamber 5 and the detection chamber 18 generates, according to the photo-acoustic effect, pressure variations having a frequency corresponding to the modulation frequency, which can be transformed into electrical output signals by means of the acoustic sensors 24, 24'.

The gas charge in the reference chamber 5 consists of a small amount of the test gas (for instance $SF_6$) and of a major part of a gas which does not absorb the laser radiation, preferably nitrogen or air. The output signal 6 of the acoustic sensor 24 of the reference chamber 5 is largest when the emission frequency spectrum of the laser and the absorption frequency spectrum of the test gas correspond most. By varying the laser temperature via the temperature set value $T_{set}$, the output signal 6 is changed over a wide range by adjusting the mode structure in the laser 1 for a given test gas concentration in the reference chamber 5. The output signal 6 is therefore a measure for the momentary operating status of the laser 1. The variable output signal 6 can be used either to calibrate the measured values 6' of the acoustic sensor 24' of the detection chamber in the analyzing circuit 26 (FIG. 1) or for controlling the temperature set value $T_{set}$ by means of the controller 8 (FIG. 2).

In both cases the detection chamber 18 is filled with a detection gas via the ducts 27, wherein the test gas concentration of the detection gas is to be determined using the device of FIGS. 1 and 2. In the case of FIG. 1 the output signal 6' is compared to the output signal 6 of the reference chamber 5 by means of the computer controlled analyzing circuit 26 in order to determine the test gas concentration. This makes a quantitative determination of the test gas concentration in the detection chamber 18 possible when the test gas concentration in the reference chamber 5 is known (calibrated), independent of the operating status of the laser 1.

In the embodiment of FIG. 2 the output signal 6 of the reference chamber 5 is governed to a defined working point of the laser I by adjusting the temperature set value $T_{set}$ by means of the controller 8, so that the intensity of the output signal 6' of the acoustic sensor 24 is a direct measure for the test gas concentration in the detection chamber 18.

In the complete photo-acoustic leak detection system schematically shown in FIG. 3 the detection chamber 13 is filled with traces of the test gas possibly escaping through a leak 28 of a test object 15 in the following manner: The test object 15, the inside of which is subjected to the test gas via the connection 30, is placed inside a test chamber 13 which has at its inlet side an inlet valve 16 which can be subjected to ambient air or a scavaging gas at its inlet 17, and a vacuum pump 10 at its outlet side. Two stop valves 12, 11 are disposed one behind the other between the test chamber 13 and the vacuum pump 10, wherein the stop valve 12 near the test chamber is bridged by a bypass duct 27 which is connected to the detection chamber 18.

The leak test is performed as follows:

The test object 15 is placed inside the test chamber 13 and subjected to pressurized test gas via the connection 30;

gas is then pumped out of the inside 14 of the test chamber 13 by means of the vacuum pump 10 with open valves 11, 12 and closed valve 16, until the pressure in the chamber has reached a predetermined small value;

the valves 11, 12 are closed and the valve 16 is opened thereafter, so that the test chamber 13 and the detection chamber 18 are flooded with scavaging gas (preferably ambient air at atmospheric pressure) via the connection 17;

the test gas concentration in the detection chamber 18 is then determined using the photo-acoustic device 9.

The cleaning of the test chamber 13 and of the detection chamber 18 of residual test gas after a measurement has been performed is done by removing the test gas from the test object 15 via the connection 30 or removing the test object 15 itself from the test chamber 13;

evacuating the test chamber 13 and the detection chamber 18 at least once with the valves 12, 16 being closed and the valve 11 being open, and then filling the chambers 13, 18 with a scavaging gas which does not contain any of the test gas with the valves 11, 12 being closed and the valve 16 being open.

In summary the following is to be stated: The invention relates to a method and a device for checking the leak tightness of containers, housings, and similar test objects 15. The test object 15 is subjected to a pressurized gas. If a leak 28 is present, test gas escapes from the test object 15 and is exposed in a detection chamber 18 to an intensity-modulated electromagnetic wave field emitted by a laser 1. The wave field contains frequency components which are absorbed by the test gas to produce a photo-acoustic signal indicative of a leak. In order to facilitate a quantitative leak tightness examination even using a longitudinal multi-mode laser having several laser modes which can be absorbed by the test gas, it is proposed according to the invention that the temperature of the laser 1 is set to a temperature set value and that the excitation power of the laser is held constant over a time average, so that the photo-acoustic signal can be measured and evaluated as a measure of the test gas concentration in the detection chamber and/or the size of a leak in the test object. In order to improve the measuring accuracy, a reference chamber 5 with a predetermined test gas concentration is additionally exposed to the intensity-modulated wave field emitted by the laser 1, wherein the photo-acoustic signal 6 generated in the reference chamber 5 is used either for calibration purposes when determining the test gas concentration in the detection chamber 18 or for adjusting the temperature set value $T_{set}$ of the laser 1 to a predetermined working point.

We claim:

1. A method for testing the leak tightness of test objects having an interior for containing a fluid and an exterior, in which the interior of the test object receives a pressurized test gas and, in the instance of a leak, test gas escapes from the test object, a test volume of gas from the exterior of the test object being subjected to an intensity-modulated electromagnetic radiation field, the electromagnetic radiation field being emitted by a laser, the electromagnetic radiation field having frequencies which are absorbed by the test gas, the absorption causing emission of a photo-acoustic signal serving to indicate a leak, the improvement wherein temperature of the laser is controlled at a temperature set value, and the photo-acoustic signal is sensed and analyzed to measure concentration of the test gas in the test volume and/or the size of a leak in the test object.

2. The method of claim 1, the intensity modulated electromagnetic radiation field of the laser being a result of an excitation power of the laser, the excitation power being held constant over a time average.

3. The method of claim 1, wherein the laser comprises a longitudinal multi-mode laser.

4. The method of claim 3, wherein the laser has a plurality of laser modes absorbable by the test gas.

5. The method of claim 1, wherein the intensity of the radiation field is modulated by chopping a laser beam emitted by the laser or by pulsing excitation power of the laser.

6. The method of claim 1, wherein the set value for the temperature of the laser is varied, and the change of intensity of the photo-acoustic signal caused by variations in the temperature, determines the test gas concentration in the test volume and/or the size of a leak in the test object even when other laser light-absorbing gases are present.

7. The method of claim 1, wherein a reference volume having a given test gas concentration receives the intensity-modulated radiation field emitted by the laser, and a second photo-acoustic signal generated by the radiation field being absorbed by the test gas in the reference volume is measured and analyzed together with the first photo-acoustically generated signal measured in the test volume in order to determine the test gas concentration in the test volume and/or the size of a leak in the test object.

8. The method of claim 1, wherein a reference volume having a given concentration of the test gas is subjected to the intensity-modulated radiation field emitted by the laser, and the intensity of a second photo-acoustic signal generated in the reference volume is measured and controlled by adjusting the temperature set value of the laser.

9. The method of claim 8, wherein the temperature set value of the laser is varied before effecting the adjustment and determines a characteristic temperature dependent on the second photo-acoustic signal generated in the reference volume, such that a set point for the adjustment is dependent on the temperature characteristic.

10. The method of claim 8, wherein an intensity maximum of the second photo-acoustic signal generated in the reference volume is present at the set point of the laser.

11. The method of claim 1, wherein the temperature set value is chosen to be lower than ambient temperature.

12. The method of claim 1, wherein the photo-acoustic signal is transformed into electrical output signals by a microphone, and analyzed to determine intensity.

13. The method of claim 1, the test volume being contained in a detection chamber.

14. A test device for testing the leak tightness of containers, housings and similar test objects adapted to contain a pressurized test gas, comprising:

a detection chamber for accepting ambient gases from the exterior of the test object, the ambient gases containing the test gas in the case of a leak, a laser for creating an intensity-modulated laser beam which passes through said detection chamber, a first acoustic sensor disposed within the detection chamber for measuring photo-acoustic signals generated in the detection chamber by the laser beam and the test gas, and a control circuit for controlling the temperature of the laser according to a set temperature value.

15. The test device of claim 14, wherein the temperature control circuit comprises, as a control element, at least one thermoelectric element disposed on a surface of said laser preferably designed to be a Peltier element.

16. The test device of claim 14, including a reference chamber through which the intensity-modulated laser beam passes, said reference chamber containing a defined concentration of test gas, and a second acoustic sensor for measuring photo-acoustic signals generated by the laser beam and the test gas, said second acoustic sensor being disposed within said reference chamber.

17. The test device of claim 16, including an analyzing device for determining the test gas concentration in said detection chamber and/or the size of a leak in the test object, said analyzing device receiving the photo-acoustic signals of said first and second acoustic sensors.

18. The test device of claim 16, said control circuit adjusting the temperature set value of said laser according to a deviation of the intensity of the photo-acoustic signal of said second acoustic sensor in said reference chamber from the intensity value of a predetermined working point.

19. The test device of claim 18, wherein the working point corresponds to the intensity maximum of the photo-acoustic signal generated in said reference chamber, the intensity maximum being obtained as a function of the laser temperature.

20. The test device of claim 18, wherein said control circuit comprises a proportional integral, derivative controller.

21. The test device of claim 16, said detection chamber being disposed in the beam axis of the laser beam following said reference chamber.

22. The test device of claim 16, wherein said reference chamber and said detection chamber are constructed identically to each other and have the same volume.

23. The test device of claim 14, including a test chamber for accepting the test object which receives the test gas, said test chamber having a gas inlet and a gas outlet, an inlet valve disposed at the inlet side of said test chamber adapted to be subjected at the inlet side to ambient air or a scavaging gas, a vacuum pump disposed at the outlet side of the test chamber, two stop valves disposed one behind the other between said test chamber and said vacuum pump, and a bypass duct connected to said detection chamber and forming a bridge over said stop valve on the test chamber side.

24. The test device of claim 14, including an adjusting device for adjusting excitation power of the laser such that the excitation power is constant over a time average.

25. A method for testing the leak tightness of containers, housings, and similar test objects, the method comprising:

applying a pressurized test gas to the interior of the test object to detect a leak if the test gas escapes from the test object, the test object being inside a test chamber;

transporting a test volume of gas from outside of the test object in the test chamber to a detection chamber;

applying an intensity-modulated electromagnetic radiation field, emitted by a laser, to the test volume of gas in the detection chamber, the electromagnetic radiation field having frequencies which are absorbed by the test gas causing a photo-acoustic signal that indicates a leak; and sensing and analyzing the photo-acoustic signal in the test volume to measure the concentration of test gas therein, and/or the size of a leak in the test object.

* * * * *